United States Patent
Taniguchi

[19]
[11] Patent Number: 6,141,171
[45] Date of Patent: Oct. 31, 2000

[54] CUE SIGNAL DETECTION CIRCUIT OF MAGNETIC RECORDING AND REPRODUCING DEVICE

[75] Inventor: Satoru Taniguchi, Kanagawa, Japan

[73] Assignee: NEC Corporation, Tokyo, Japan

[21] Appl. No.: 09/067,207

[22] Filed: Apr. 28, 1998

[30] Foreign Application Priority Data

Apr. 28, 1997 [JP] Japan .................................. 9-110818

[51] Int. Cl.[7] ............................................. G11B 15/18
[52] U.S. Cl. ........................................... 360/72.1; 360/51
[58] Field of Search ................................ 360/51, 55, 69, 360/71, 73.12, 72.1, 72.2, 72.3

[56] References Cited

U.S. PATENT DOCUMENTS

| | | | |
|---|---|---|---|
| 3,564,161 | 2/1971 | Takishima | 360/72.2 |
| 4,316,224 | 2/1982 | Hansen et al. | 360/72.2 |
| 4,470,085 | 9/1984 | Kanayama | 360/72.3 X |
| 4,707,749 | 11/1987 | Nishijima et al. | 360/74.4 X |
| 4,887,172 | 12/1989 | Steele | 360/72.3 X |
| 4,958,242 | 9/1990 | Aoki | 360/27 |
| 5,140,435 | 8/1992 | Suzuki et al. | 360/72.2 X |
| 5,251,075 | 10/1993 | Yoshida et al. | 360/18 |
| 5,604,648 | 2/1997 | Oh | 360/73.11 |

FOREIGN PATENT DOCUMENTS

| | | |
|---|---|---|
| 0 439 615 A1 | 8/1991 | European Pat. Off. . |
| 50-39517 | 4/1975 | Japan . |
| 55-14542 | 2/1980 | Japan . |
| 57-88543 | 6/1982 | Japan . |
| 60-83243 | 5/1985 | Japan . |
| 61-061250 | 3/1986 | Japan . |
| 61-90092 | 6/1986 | Japan . |
| 2-134757 | 5/1990 | Japan . |
| 5-135433 | 6/1993 | Japan . |
| 5-211642 | 8/1993 | Japan . |

OTHER PUBLICATIONS

Matsushita Electric Works Ltd. (1991) Instruction Manual for PanaX Series *Microcomputer LSI MN 67512 MN 67520*: 128–145.

*Primary Examiner*—Andrew L. Sniezek
*Attorney, Agent, or Firm*—Scully, Scott, Murphy & Presser

[57] ABSTRACT

A cue signal detection circuit including a CTL head for reading a reproduction control signal recorded on a magnetic tape, an amplification circuit for converting a reproduction control signal into a digital signal, a filter unit for converting a digital signal into an analog voltage corresponding to a duty ratio of the signal, a frequency-dividing circuit for generating a timing signal in accordance with the operation of a capstan motor, and an analog-to-digital conversion circuit and a determination circuit for taking in a voltage value of a reproduction control signal converted into an analog voltage in response to a timing signal to detect a cue signal from among reproduction control signals based on the taken in voltage value.

13 Claims, 9 Drawing Sheets

FIG. 5

| CTL SIGNAL INPUT FREQUENCY | 1kHz | 10kHz | 20kHz | 30kHz |
|---|---|---|---|---|
| ONE PULSE WIDTH | 1ms | 100μs | 50μs | 33μs |
| DUTY RATIO DETERMINATION PROCESSING TIME (2MHz: 40-80us) | ◎ | △ | × | × |
| DUTY RATIO DETERMINATION PROCESSING TIME (4MHz: 20-40us) | ◎ | ○ | △ | × |
| DUTY RATIO DETERMINATION PROCESSING TIME (8MHz: 10-20us) | ◎ | ○ | ○ | △ |
| THE NUMBER OF TIMER COUNTED BITS (REFERENCE CLOCK: 2MHz) | 11 | 8 | 7 | 6 |
| THE NUMBER OF TIMER COUNTED BITS (REFERENCE CLOCK: 4MHz) | 12 | 9 | 8 | 7 |
| THE NUMBER OF TIMER COUNTED BITS (REFERENCE CLOCK: 8MHz) | 13 | 10 | 9 | 8 |

(A) (PRIOR ART)

| CTL SIGNAL INPUT FREQUENCY | 1kHz | 10kHz | 20kHz | 30kHz |
|---|---|---|---|---|
| ONE PULSE WIDTH | 1ms | 100μs | 50μs | 33μs |
| DUTY RATIO DETERMINATION PROCESSING TIME (2MHz: 4-8us) | ◎ | ◎ | ◎ | ○ |
| DUTY RATIO DETERMINATION PROCESSING TIME (4MHz: 2-4us) | ◎ | ◎ | ◎ | ◎ |
| DUTY RATIO DETERMINATION PROCESSING TIME (2MHz: 1-2us) | ◎ | ◎ | ◎ | ◎ |

(B) (INVENTION)

CUE SIGNAL DETECTION CIRCUIT OF MAGNETIC RECORDING AND REPRODUCING DEVICE

BACKGROUND OF THE INVENTION

1. Field of the Invention

The present invention relates to a cue signal detection circuit mounted on a magnetic recording and reproducing device which reads and writes data from/on a magnetic tape for detecting, from among reproduction control signals recorded on the magnetic tape, a cue signal recorded at a predetermined cue position.

2. Description of the Related Art

A magnetic recording and reproducing device which reads and writes data from/on a magnetic tape such as a video equipment has a capstan motor mounted thereon for driving rotation for fast-forwarding and rewind of a magnetic tape. For controlling rotation of a capstan motor a cue signal detection circuit is provided which reads reproduction control signals recorded on a magnetic tape and detects a cue signal from among the signals. Reproduction control signal is a signal recorded, at the time of recording of a data signal on a magnetic tape, together with the data signal for the purpose of controlling reproduction of the data signal. Cue signal is a reproduction control signal recorded at a predetermined cue position (e.g. at a position of a data signal on a magnetic tape at the start of recording) for the purpose of indicating the cue position.

One example of conventional cue signal detection circuits of a magnetic recording and reproducing device of this kind is recited in Japanese Patent Laying-Open (Kokai) No. Hesei 5-135433, entitled "Cue Signal Detection Unit of Magnetic Recording and Reproducing Device". The cue signal detection circuit recited in the literature detects a cue signal based on a duty ratio of a reproduction control signal reproduced from a magnetic tape and in response to the detected cue signal, repeats rewind and fast-forwarding of the magnetic tape to locate the cue position. More specifically, every time a mode control circuit passes a recording position of a cue signal on the tape to detect the cue signal, fast-forwarding and rewind of the magnetic tape are repeated to gradually shorten a travel distance, thereby ultimately reaching the recording position of the cue signal (cue position). In addition, a pulse signal in accordance with a rotation speed of a capstan motor which is directly detected from the capstan motor by a capstan head (hereinafter referred to as a capstan signal CFG) is counted. The counted value corresponds to a travel distance of the magnetic tape and one pulse is equivalent to a travel distance of one centimeter. Then, based on a travel distance of the magnetic tape converted from the counted value of capstan signals CFG, a rotation speed of the capstan motor is controlled. Therefore, a time from when position of a cue signal is specified until when running is stopped is constant, independent of the rotation speed of the capstan motor.

One example of conventional techniques of improving a control signal duty ratio determining method aimed at reducing a time required for locating a reproduction control signal is recited in Instruction Manual for LSI MN67512/ MN67520 manufactured by Matsushita Electric Works, Ltd. (published in January 1991, pp.128–145). FIG. 8 shows a relationship between a magnetic tape and a capstan motor in the magnetic recording and reproducing device recited in this Instruction Manual, while FIG. 9 shows structure of a cue signal detection circuit in a block diagram. With reference to FIGS. 8 and 9 together, the conventional cue signal detection circuit includes a CTL head 201, an amplification circuit 202, a timer unit 203, a high-period capture unit 204, a low-period capture unit 205 and a comparison circuit 206, with a magnetic tape 101 run at a high speed by a capstan motor 102 which conducts fast-forward and rewind of the magnetic tape 101 to take in a reproduction control signal CTL recorded on the magnetic tape 101 through the CTL head 201.

The reproduction control signal CTL taken in by the CTL head 201 is sent to the amplification circuit 202, amplified to have an appropriate signal level there and then output as a reproduction control signal CTL converted into a digital signal. The high-period capture unit 204 takes in a value of the timer unit 203 on a leading edge of the applied reproduction control signal CTL, as well as initializing the timer unit 203. The low-period capture unit 205 takes in a value of the timer 203 on a trailing edge of the reproduction control signal CTL. The comparison circuit 206 compares the values of the timer taken in by the high-period capture unit 204 and the low-period capture unit 205 to determine whether a cue signal exists or not based on the comparison results.

The above-described conventional cue signal detection circuit has a drawback that in cue signal detection made when a magnetic tape travels at a low speed and a high speed, limitations are imposed on a traveling speed of the magnetic tape.

The reason is as follows. In a conventional cue signal detection circuit, since a traveling speed and a frequency of a reproduction control signal CTL is proportional to each other, the higher a traveling speed of a magnetic tape is, the higher the frequency of a reproduction control signal CTL becomes, and the lower the traveling speed of the tape is, the lower the frequency of the reproduction control signal CTL becomes. In addition, an ordinary reproduction control signal CTL is recorded with a duty ratio of 60% and a cue signal is recorded with a duty ratio of 27.5%. Then, a pulse width is measured in every cycle of the reproduction control signal CTL because a counted value of capstan signals CFG which is obtained by the timer unit 203 is used for detecting a cue signal of a reproduction control signal CTL. Therefore, a frequency of a pulse enabling determination of a duty ratio of a reproduction control signal CTL is dependent on a reference clock CLK supplied to the timer unit 203, the number of CFG signals countable by the timer 203 and a duty ratio determination processing time.

SUMMARY OF THE INVENTION

An object of the present invention is to provide a cue signal detection circuit which eliminates the above described conventional drawbacks and is capable of detecting a cue signal from among reproduction control signals with high precision independently of a frequency of the reproduction control signal even when a magnetic tape travels at a high speed.

Another object of the present invention is to provide a cue signal detection circuit which achieves the above object by simple circuit structure to allow reduction in circuit scale and costs of a magnetic recording and reproducing device.

According to one aspect of the invention, a cue signal detection circuit mounted on a magnetic recording and reproducing device which reads and writes data from/to a magnetic tape on which data is magnetically recorded for detecting, from among reproduction control signals recorded on the magnetic tape together with the data for use in controlling operation of driving means which runs the magnetic tape, a cue signal recorded with a duty ratio different from that of an ordinary reproduction control signal, comprises read means for reading a reproduction control signal recorded on the magnetic tape, analog-to-digital conversion means for converting a reproduction control signal read by the read means into a digital signal, filter means for converting a digital signal generated by the analog-to-digital conversion means into an analog voltage corresponding to a duty ratio of the signal, timing signal generation means for generating a timing signal synchronized with the reproduction control signal in accordance with the operation of the driving means, and cue signal detection means for taking in a voltage value of the reproduction control signal converted into an analog voltage by the filter means at the timing of the timing signal generated by the timing signal generation means to detect the cue signal from among the reproduction control signals based on the taken in voltage value.

The filter means may be an integration circuit structured by a combination of a resistor element and a capacitor element.

In the preferred construction, the driving means is a capstan motor for conducting fast-forward and rewind of the magnetic tape, and the timing signal generation means detects a capstan signal based on a rotation speed of the capstan motor and frequency-divides the detected capstan signal to generate the timing signal synchronized with the reproduction control signal.

In the preferred construction, the cue signal detection means comprises second analog-to-digital conversion means for taking in a voltage value of the reproduction control signal converted into an analog voltage by the filter means at the timing of the timing signal generated by the timing signal generation means and converting the same into a digital signal, and determination means for comparing a voltage value of a digital signal generated by the second analog-to-digital conversion means and a preset determination reference voltage to determine whether the reproduction control signal is the cue signal or not based on the comparison results.

In the preferred construction, the filter means is an integration circuit structured by a combination of a resistor element and a capacitor element, and the cue signal detection means comprises second analog-to-digital conversion means for taking in a voltage value of the reproduction control signal converted into an analog voltage by the filter means at the timing of the timing signal generated by the timing signal generation means and converting the same into a digital signal, and determination means for comparing a voltage value of a digital signal generated by the second analog-to-digital conversion means and a preset determination reference voltage to determine whether the reproduction control signal is the cue signal or not based on the comparison results.

In another preferred construction, the driving means is a capstan motor for conducting fast-forward and rewind of the magnetic tape, the timing signal generation means detects a capstan signal based on a rotation speed of the capstan motor and frequency-divides the detected capstan signal to generate the timing signal synchronized with the reproduction control signal, and the cue signal detection means comprises second analog-to-digital conversion means for taking in a voltage value of the reproduction control signal converted into an analog voltage by the filter means at the timing of the timing signal generated by the timing signal generation means and converting the same into a digital signal, and determination means for comparing a voltage value of a digital signal generated by the second analog-to-digital conversion means and a preset determination reference voltage to determine whether the reproduction control signal is the cue signal or not based on the comparison results.

In another preferred construction, the filter means is an integration circuit structured by a combination of a resistor element and a capacitor element, the driving means is a capstan motor for conducting fast-forward and rewind of the magnetic tape, the timing signal generation means detects a capstan signal based on a rotation speed of the capstan motor and frequency-divides the detected capstan signal to generate the timing signal synchronized with the reproduction control signal, and the cue signal detection means comprises second analog-to-digital conversion means for taking in a voltage value of the reproduction control signal converted into an analog voltage by the filter means at the timing of the timing signal generated by the timing signal generation means and converting the same into a digital signal, and determination means for comparing a voltage value of a digital signal generated by the second analog-to-digital conversion means and a preset determination reference voltage to determine whether the reproduction control signal is the cue signal or not based on the comparison results.

In another preferred construction, the cue signal detection means comprises comparison means for comparing a voltage value of the reproduction control signal converted into an analog voltage by the filter means and a preset determination reference voltage, and determination means for receiving input of comparison results obtained by the comparison means at the timing of the timing signal generated by the timing signal generation means to determine whether the reproduction control signal is the cue signal or not based on the comparison results.

In another preferred construction, the filter means is an integration circuit structured by a combination of a resistor element and a capacitor element, and the cue signal detection means comprises comparison means for comparing a voltage value of the reproduction control signal converted into an analog voltage by the filter means and a preset determination reference voltage, and determination means for receiving input of comparison results obtained by the comparison means at the timing of the timing signal generated by the timing signal generation means to determine whether the reproduction control signal is the cue signal or not based on the comparison results.

In another preferred construction, the driving means is a capstan motor for conducting fast-forward and rewind of the magnetic tape, the timing signal generation means detects a capstan signal based on a rotation speed of the capstan motor and frequency-divides the detected capstan signal to generate the timing signal synchronized with the reproduction control signal, and the cue signal detection means comprises comparison means for comparing a voltage value of the reproduction control signal converted into an analog voltage by the filter means and a preset determination reference voltage, and determination means for receiving input of comparison results obtained by the comparison means at the timing of the timing signal generated by the timing signal generation means to determine whether the reproduction control signal is the cue signal or not based on the comparison results.

In another preferred construction, the filter means is an integration circuit structured by a combination of a resistor element and a capacitor element, the driving means is a capstan motor for conducting fast-forward and rewind of the magnetic tape, the timing signal generation means detects a capstan signal based on a rotation speed of the capstan motor and frequency-divides the detected capstan signal to generate the timing signal synchronized with the reproduction control signal, and the cue signal detection means comprises comparison means for comparing a voltage value of the reproduction control signal converted into an analog voltage by the filter means and a preset determination reference voltage, and determination means for receiving input of comparison results obtained by the comparison means at the timing of the timing signal generated by the timing signal generation means to determine whether the reproduction control signal is the cue signal or not based on the comparison results.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIGS. 5A and 5B diagrams showing comparison between time required for determination processing in the first embodiment and that in conventional art.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

First, a cue signal detection circuit of a magnetic recording and reproducing device according to the present invention will be described in outline. According to the present invention, a reproduction control signal recorded on a magnetic tape is read and digitized to generate a reproduction control signal shaped to have a pulse-like rectangular waveform. Next, the digitized reproduction control signal is converted into an analog voltage proportional to a duty ratio. Then, based on a voltage value of the reproduction control signal converted into the analog voltage, a cue signal is detected from among the reproduction control signals. At this time, in order to increase precision in detection of a voltage of a reproduced control signal converted into an analog voltage, the voltage detection from the reproduction control signal converted into the analog voltage is conducted at the timing obtained by frequency-dividing a rotation speed signal (capstan signal CFG) which is directly detected from a capstan motor.

As a magnetic recording and reproducing device to which the technique of the present invention is applied, common are video recorders and video reproducing devices and in these cases, a magnetic tape is intended to be a video tape on which picture and voice data are recorded. It is clear, however, that application of the present invention is not limited to video data recording and reproducing devices but is widely possible to devices which record and reproduce data on/from a magnetic tape.

Figure 1:
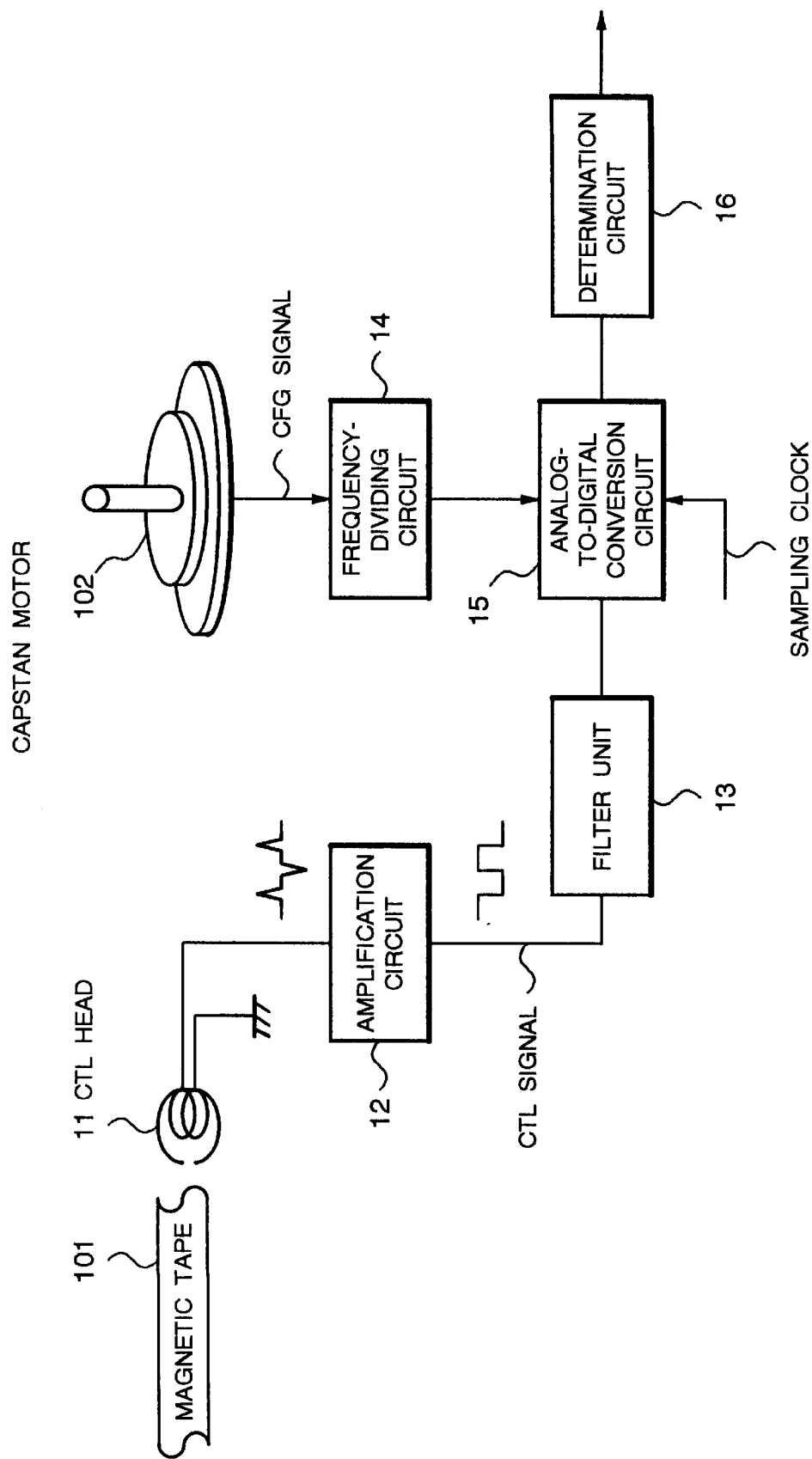
FIG. 1 is a block diagram showing structure of a cue signal detection circuit according to a first embodiment of the present invention.

FIG. 1 is a block diagram showing structure of a cue signal detection circuit according to a first embodiment of the present invention. With reference to FIG. 1, provided as peripheral components of the cue signal detection circuit are a magnetic tape 101 on which a reproduction control signal CTL is magnetically recorded together with data and a capstan motor 102 for driving the magnetic tape 101. The signal detection circuit of the present embodiment includes a CTL head 11 for detecting a cue signal from among reproduction control signals CTL recorded on the magnetic tape 101, an amplification circuit 12, a filter unit 13, an analog-to-digital conversion circuit 15 and a determination circuit 16, and a frequency-dividing circuit 14 for determining operation timing of the analog-to-digital conversion circuit 15. In FIG. 1, illustration is made only of a characteristic part of the structure of the present embodiment and that of the remaining common part is omitted.

The CTL head 11 reads a reproduction control signal CTL recorded on the magnetic tape 101. The amplification circuit 12 appropriately amplifies a reproduction control signal CTL read by the CTL head 11 and converts the same into a digital signal. The filter unit 13 converts a reproduction control signal CTL amplified and digitized by the amplification circuit 12 into an analog voltage. The frequency-dividing circuit 14 frequency-divides a capstan signal CFG detected from the capstan motor 102 by a frequency-dividing ratio which is a frequency ratio of a reproduction control signal CTL to a rotation speed signal. The analog-to-digital conversion circuit 15 converts an analog voltage output from the filter unit 13 into a digital signal according to a step of a pulse signal output from the frequency-dividing circuit 14. The determination circuit 16 determines whether a reproduction control signal CTL converted into a digital signal is a cue signal or not.

Next, operation of the first embodiment will be detailed with reference to the accompanying drawings.

Figure 2:
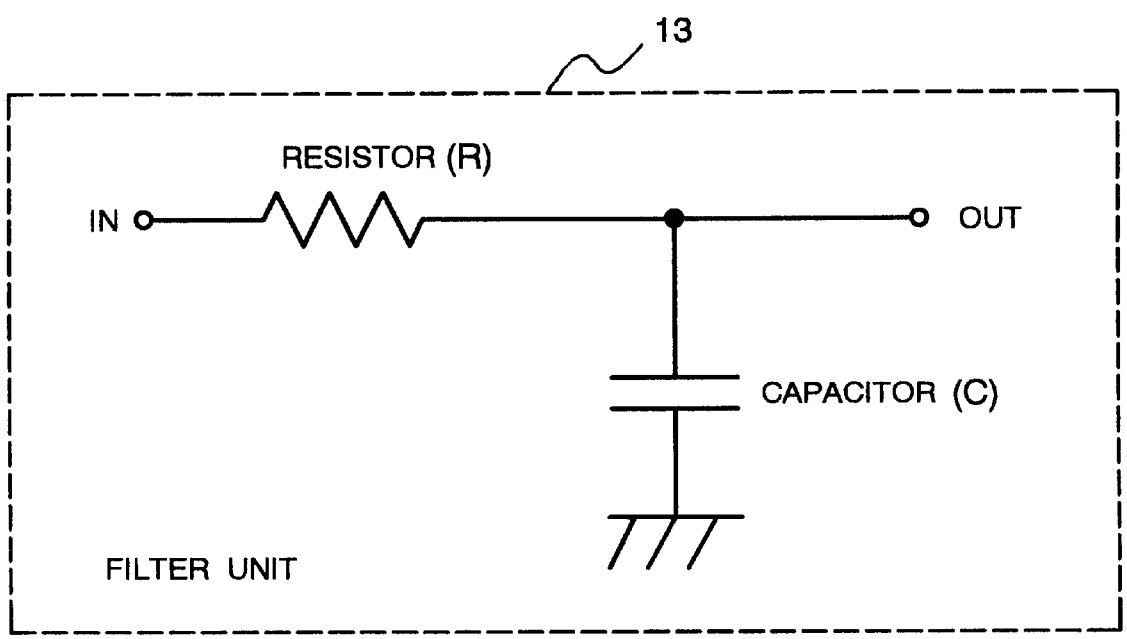
FIG. 2 is a circuit diagram showing structure of a filter unit in the first embodiment.
Figure 3:
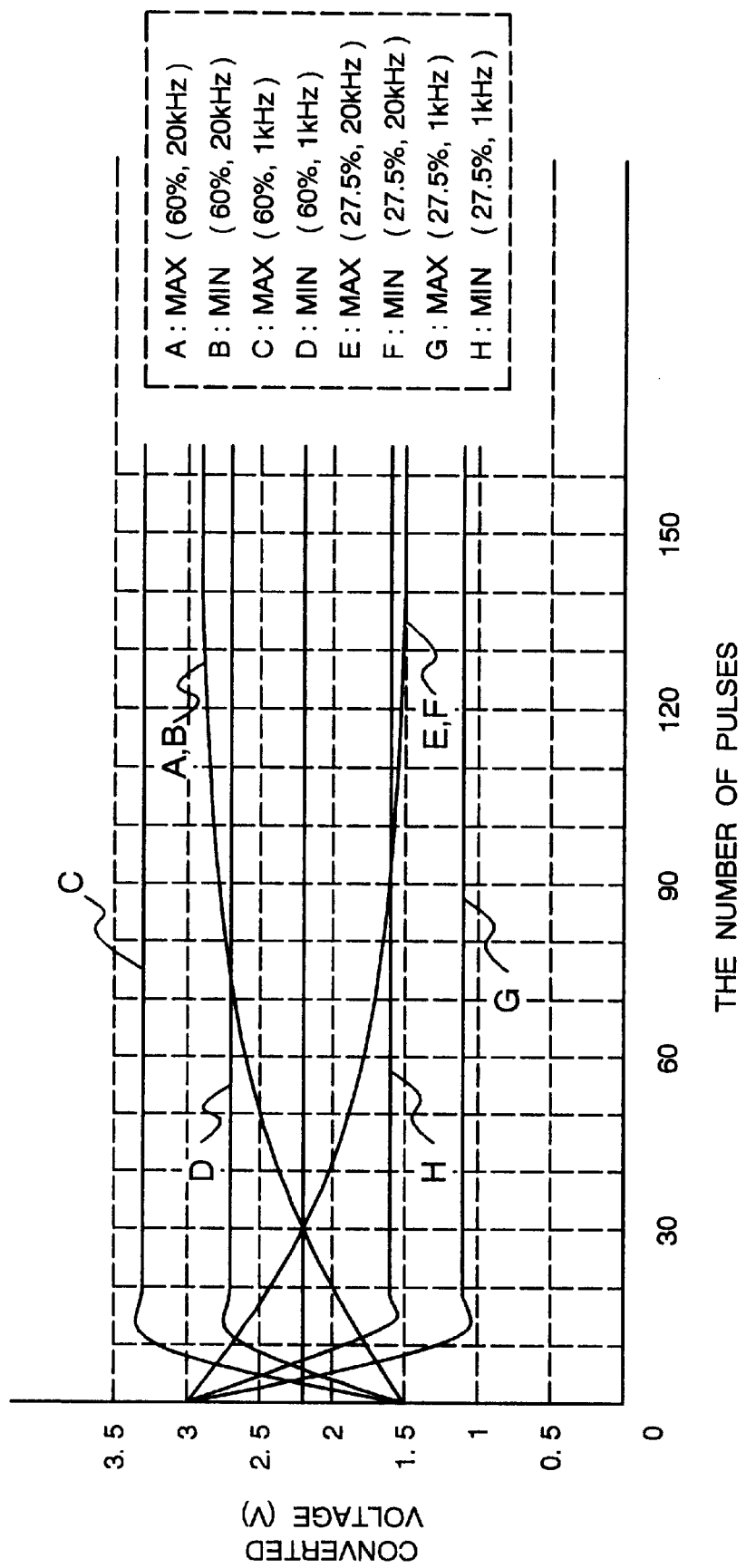
FIG. 3 is a diagram showing output of the filter unit illustrated in FIG. 2 in the form of a relationship between the number of pulses and a converted voltage of a reproduction control signal.
Figure 4:
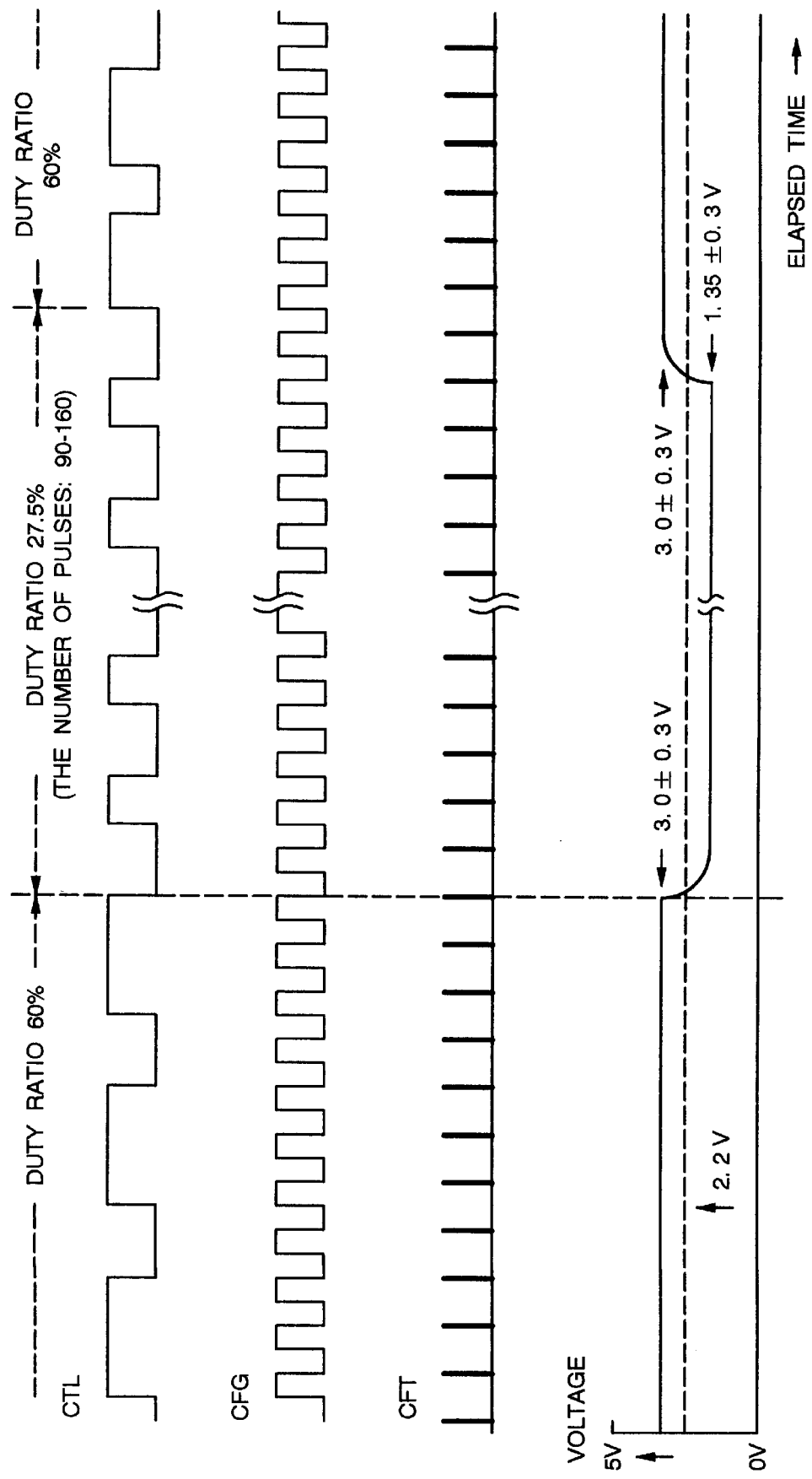
FIG. 4 is a timing chart showing timing of converting a reproduction control signal into an analog voltage in the first embodiment.

FIG. 2 is a circuit diagram of the filter unit 13, FIG. 3 is a diagram showing a relationship between the number of pulses and a converted voltage of a reproduction control signal CTL, and FIG. 4 is a timing chart showing timing of converting a reproduction control signal CTL into an analog voltage.

First, a reproduction control signal CTL recorded on the magnetic tape 101 is read by the CTL head 11 and then at the amplification circuit 12, it is amplified to have a predetermined signal level and is also shaped to have a rectangular waveform to be converted into a digital signal. Next, the reproduction control signal CTL converted into the digital signal by the amplification circuit 12 is converted into an analog voltage proportional to a duty ratio by the filter unit 13. More specifically, the output change is given by the following expression when such an integration-type filter unit 13 is used which is composed of a resistor (R) and a capacitor (C) as shown in FIG. 2.

$$V_{n+1} = a(b^n-1)/(b-1) + b^n \times V_0$$

In the above expression, it is assumed as follows:

V: peak voltage of an input signal $V_0$: an output initial voltage n: the number of pulses (n>0)

$a = V \times K_1 \times K_2$ $b = K_2 \times (1-K_1)$, where $K_1 = 1 - \mathrm{EXP}(-T_1/RC)$ $K_2 = \mathrm{EXP}(-T_2/RC)$ R: resistance value C: capacitance of capacitor $T_1$: input signal high-level period $T_2$: input signal low-level period.

A relationship between the number of pulses and a converted voltage established when the input signal has a frequency of 1 kHz and 20 kHz is shown in FIG. 3, with 2.2 KΩ substituting for R and 1 μF for C in the above expression. In a case where a reproduction control signal CTL applied to the filter unit 13 has a frequency of 1 kHz to 20 Khz, assuming a cue signal reference voltage to be 2.2 V, an ordinary reproduction control signal CTL (duty ratio of 60%) is converted into 3V±0.3V and a cue signal (duty ratio of 27.5%) of a reproduction control signal CTL is converted into 1.35V±0.3V as shown in FIG. 3.

More specifically, in a case of a reproduction control signal CTL in a duty ratio of 60% and a frequency of 20 kHz, the maximum value and the minimum value of a converted voltage show a waveform gradually rising as the number of pulses increases as denoted by the curve A, B in FIG. 3. The voltage reaches 2.2V of the reference voltage at the pulses to the number of 30 and reaches about 2.9V at the pulses to the number of 140. In a case of a CTL in a duty ratio of 60% and a frequency of 1 kHz, the maximum converted voltage, as denoted by the curve C in FIG. 3, reaches about 3.2V at the pulses to the number of 10 and thereafter becomes approximately constant at 3.3V irrespective of the number of pulses. The minimum converted voltage, as denoted by the curve D of FIG. 3, attains about 2.6V at the pulses to the number of 10 and thereafter becomes approximately constant at 2.7V irrespective of the number of pulses.

Similarly, in a case of a signal in a duty ratio of 27.5% and a frequency of 20 kHz, the maximum value and the minimum value of a converted voltage show a waveform gradually falling as the number of pulses increases as denoted by the curve E, F in FIG. 3. The voltage attains 2.2V of the reference voltage at the pulses to the number of 30 and attains about 1.5V at the pulses to the number of 140. In a case of a signal in a duty ratio of 27.5% and a frequency of 1 kHz, the maximum converted voltage, as denoted by the curve G in FIG. 3, attains about 1.3V at the pulses to the number of 10 and thereafter becomes approximately constant at 1.05V irrespective of the number of pulses. The minimum converted voltage, as denoted by the curve H in FIG. 3, attains about 1.9V at the pulses to the number of 10 and thereafter becomes approximately constant at 1.65V irrespective of the number of pulses.

For a capstan signal CFG detected from the capstan motor 102, such a proportional relationship is established as expressed by the following equation.

cycle of signal CTL = cycle of signal CFG × $n$ ($n \geq 1$)

Therefore, frequency-dividing a capstan signal CFG by the frequency-dividing circuit 14 leads to generation of a timing signal CFT synchronized with a reproduction control signal CTL. This enables a timing signal CFT to be generated at a fixed rate with respect to a reproduction control signal CTL irrespective neither of a rotation speed of the capstan motor 102 nor of a traveling speed of the magnetic tape 101. Generated synchronous timing signal CFT is supplied to the analog-to-digital conversion circuit 15.

The analog-to-digital conversion circuit 15 takes in a voltage value of a reproduction control signal CTL converted into an analog voltage by the filter unit 13 in response to the timing of a received timing signal CFT. The voltage value taken in by the analog-to-digital conversion circuit 15 is converted into a digital signal and is sent to the determination circuit 16.

The determination circuit 16, which is an arithmetic unit of a CPU built in the magnetic recording and reproducing device, determines based on an applied digital signal whether the reproduction control signal CTL is a cue signal or not. More specifically, the determination circuit 16 compares a determination reference voltage of 2.2V set in advance on a program which controls the CPU with an input voltage to determine, when a digital signal of the input voltage value shows a voltage higher than the determination reference voltage of 2.2V, that the signal has a duty ratio of 60%, and when the same shows a voltage lower than the determination reference voltage of 2.2 V, determine that the signal has a duty ratio of 27.5%.

In the present embodiment, a reproduction control signal CTL detected from the magnetic tape 101 is thus converted into 3V+0.3V during the period in which the signal has the duty ratio of 60% and into 1.35V+0.3V during the period in which the signal has the duty ratio of 27.5% by the filtering through the filter unit 13. The analog voltage is again converted into a digital signal by using a pulse signal obtained by frequency-dividing a capstan signal CFG whose frequency is higher than that of a reproduction control signal CTL. Then, the obtained digital signal is compared with a cue signal voltage as a reference voltage to determine a duty ratio. This procedure enables reliable detection of a cue signal in both of the cases where the magnetic tape 101 is running at a low speed and a reproduction control signal CTL has a low frequency of 1 kHz and where the magnetic tape 101 is running at a high speed and a reproduction control signal CTL has a high frequency of 20 kHz.

More specific comparison with conventional art will be made. FIG. 5 shows a list of times required for cue signal determination processing in conventional art and the present embodiment, in which FIG. 5(A) is a diagram related to conventional art and FIG. 5(B) is a diagram related to the present embodiment. In each diagram, horizontally provided are four columns respectively for a reproduction control signal CTL with a frequency of 1 kHz and a pulse width of 1 ms, a reproduction control signal CTL with a frequency of 10 kHz and a pulse width of 100 µs, a reproduction control signal CTL with a frequency of 20 kHz and a pulse width of 50 µs and a reproduction control signal CTL with a frequency of 30 kHz and a pulse width of 33 µs. In FIG. 5(A) showing conventional art, vertically indicated for each of the above-described columns provided in the horizontal direction are reproduction control signal CTL determination processing time and the number of bits counted by a timer which are indicated in correlation with each other in the Y-axis direction. More specifically, in FIG. 5(A), assuming for example that with a reproduction control signal CTL having a frequency of 1 kHz, a reference clock is 2 MHz, determination can be made within a determination processing time of 40 to 80 µs when the number of timer counted bits is 11. With a reproduction control signal CTL having a frequency of 20 kHz, assuming that a reference clock is 8 MHz, determination can be completely made within a determination processing time of 10 to 20 µs when the number of timer counted bits is 9. For taking in a reproduction control signal CTL with a frequency of 1 kHz to 20 kHz, therefore, a reference clock of the timer should be not lower than 8 MHz and the number of bits should be not lower than 13 bits.

In FIG. 5(B) showing the present embodiment, vertically indicated for each of the above-described columns provided in horizontal direction are reproduction control signal CTL determination processing times in vertical direction. More specifically, in FIG. 5(B), assuming for example that with a reproduction control signal CTL having a frequency of 1 kHz to 30 kHz, a sampling clock is 2 MHz, determination can be made within a determination processing time of 4 to 8 µs. Assuming that a sampling clock is 4 MHz, determination can be made within a determination processing time of 2 to 4 µs. Assuming that a sampling clock is 8 MHz, determination can be made within a determination processing time of 1 to 2 µs. This shows that duty ratio determination processing time is reduced to about one-fourth that of conventional art. As a result, a cue signal determination time is reduced to one-fourth that of conventional art to enable high-speed determination processing.

Figure 6:
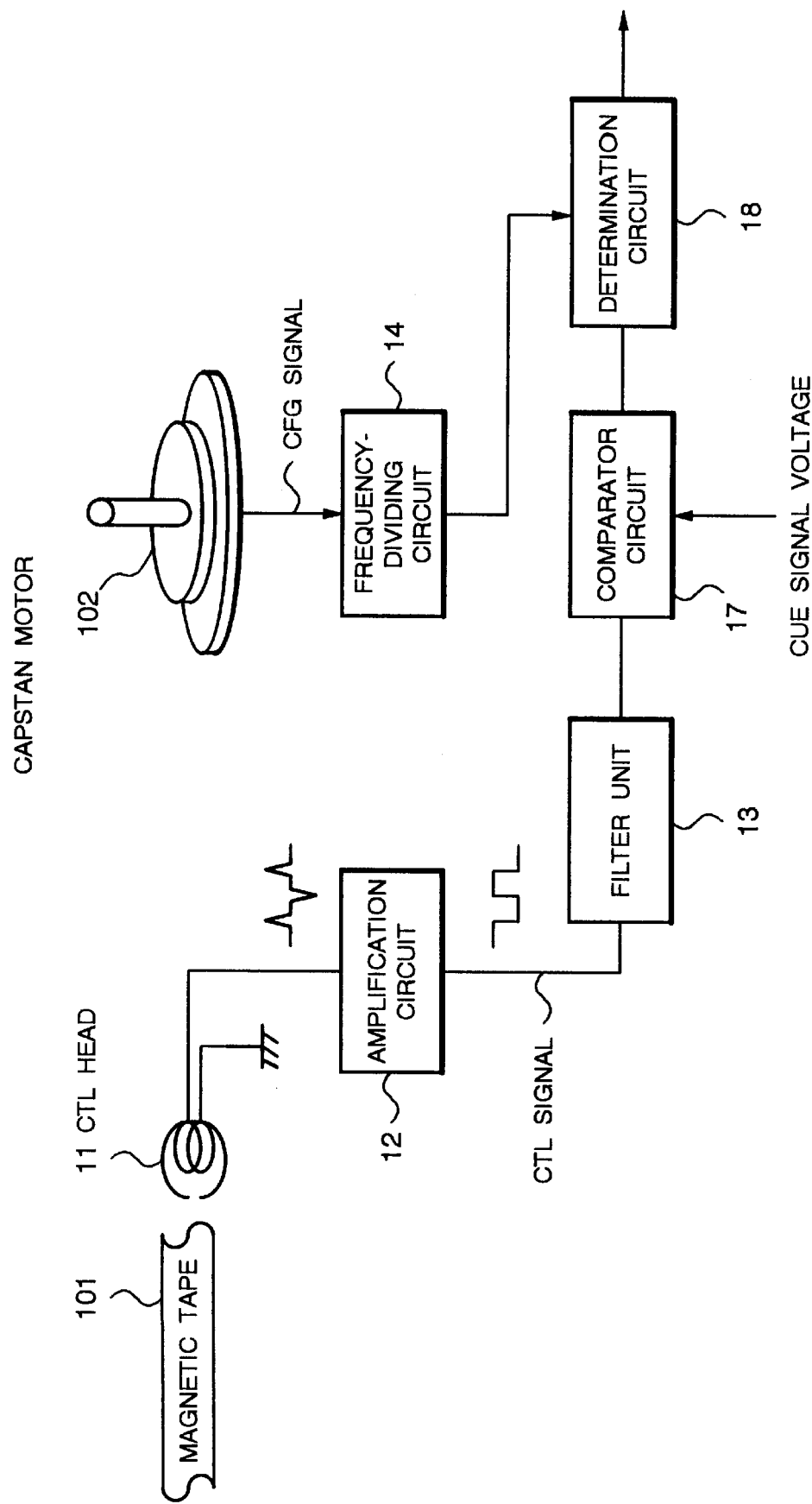
FIG. 6 is a block diagram showing structure of a cue signal detection circuit according to a second embodiment of the present invention.

FIG. 6 is a block diagram showing structure of a cue signal detection circuit according to a second embodiment of the present invention. With reference to FIG. 6, provided as peripheral components, similarly to the first embodiment shown in FIG. 1, are a magnetic tape 101 on which a reproduction control signal CTL is magnetically recorded together with data and a capstan motor 102 for driving the magnetic tape 101. The cue signal detection circuit of the present embodiment includes a CTL head 11 for detecting a cue signal from among reproduction control signals CTL recorded on the magnetic tape 101, an amplification circuit 12, a filter unit 13, a comparator circuit 17 and a determination circuit 18, and a frequency-dividing circuit 14 for determining operation timing of the determination circuit 18. In FIG. 6, illustration is made only of a characteristic part of the structure of the present embodiment and that of the remaining common part is omitted.

In the above structure, since the CTL head 11, the amplification circuit 12, the filter unit 13 and the frequency-dividing circuit 14 are the same as their counterpart components in the first embodiment shown in FIG. 1, the same reference numerals are allotted thereto to omit their description.

The comparator circuit 17 compares an analog voltage output by the filter unit 13 with a predetermined cue signal voltage. The determination circuit 18 determines whether a reproduction control signal CTL output from the comparator circuit 17 in accordance with a step of a pulse signal output from the frequency-dividing circuit 14 is a cue signal part or not. In other words, the difference from the first embodiment is that the comparator circuit 17 is provided in place of the analog-to-digital conversion circuit 15 and a capstan signal CFG supplied to the analog-to-digital conversion circuit 15 in the first embodiment is supplied to the determination circuit 18.

Figure 7:
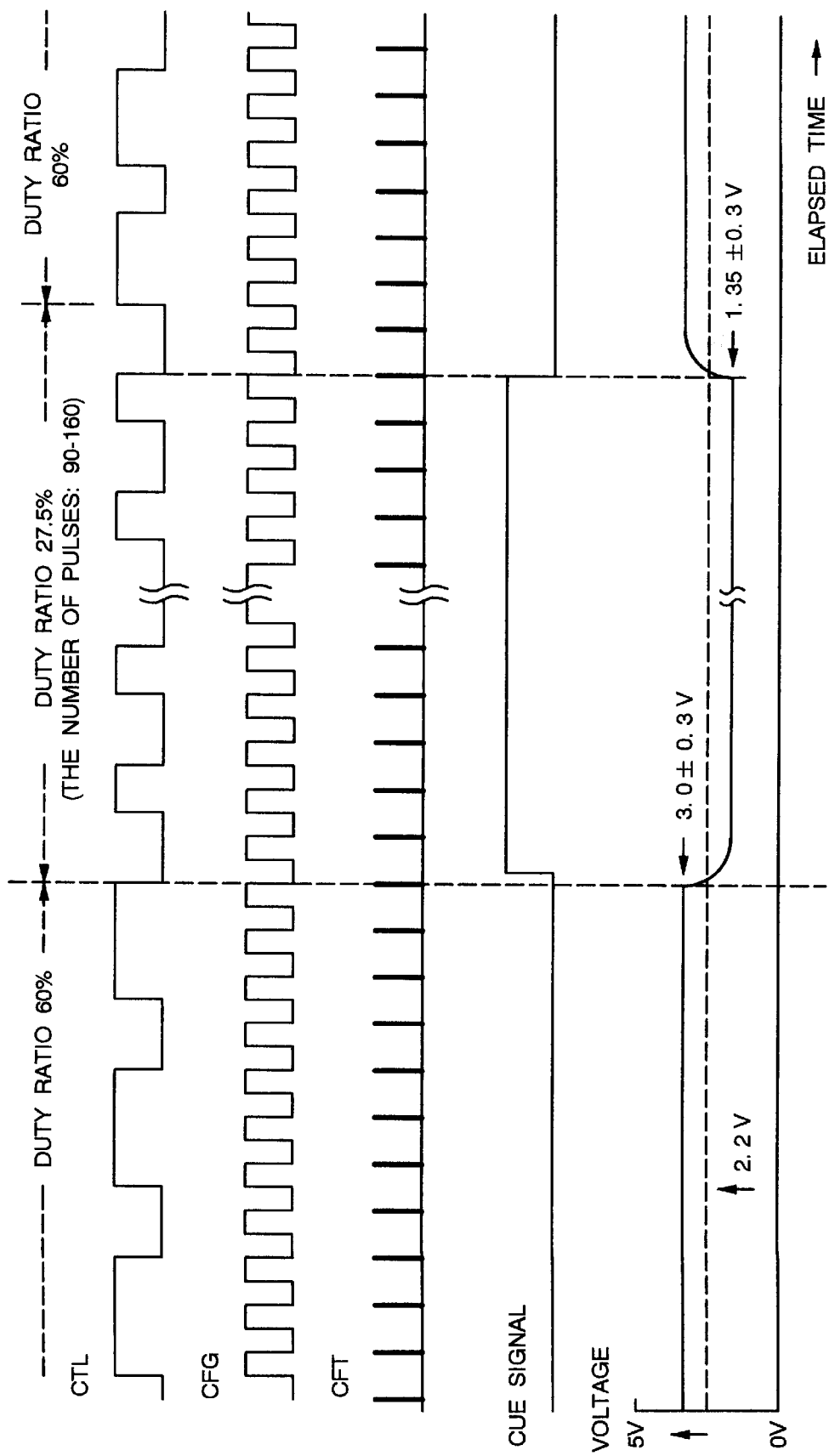
FIG. 7 is a timing chart showing timing of converting a reproduction control signal CTL into an analog voltage in the second embodiment.
Figure 8:
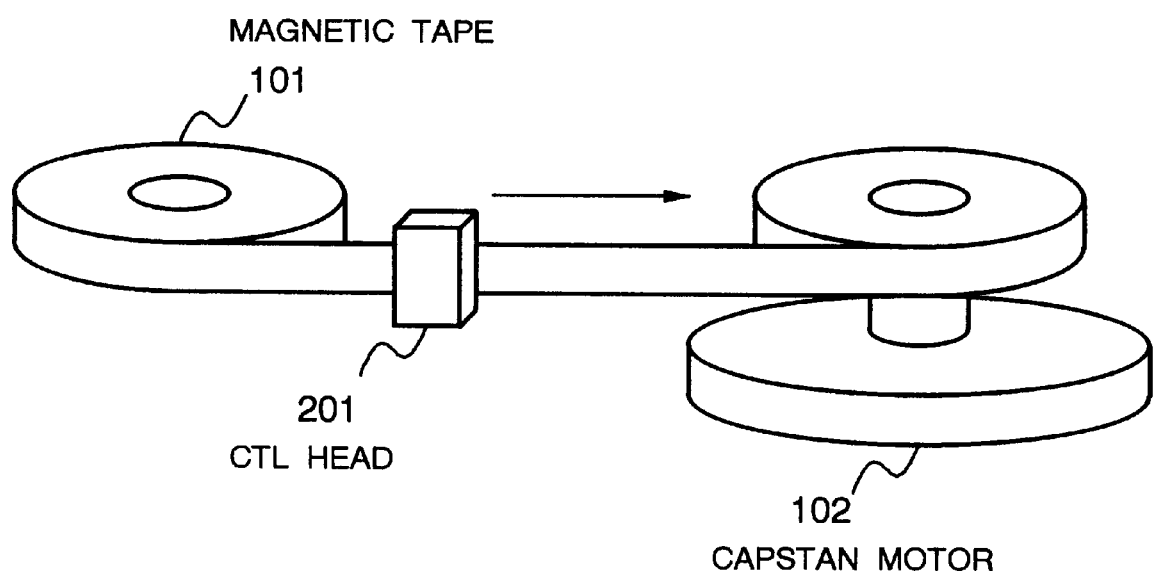
FIG. 8 is a schematic diagram showing a relationship between a magnetic tape and a capstan motor in a magnetic recording and reproducing device.
Figure 9:
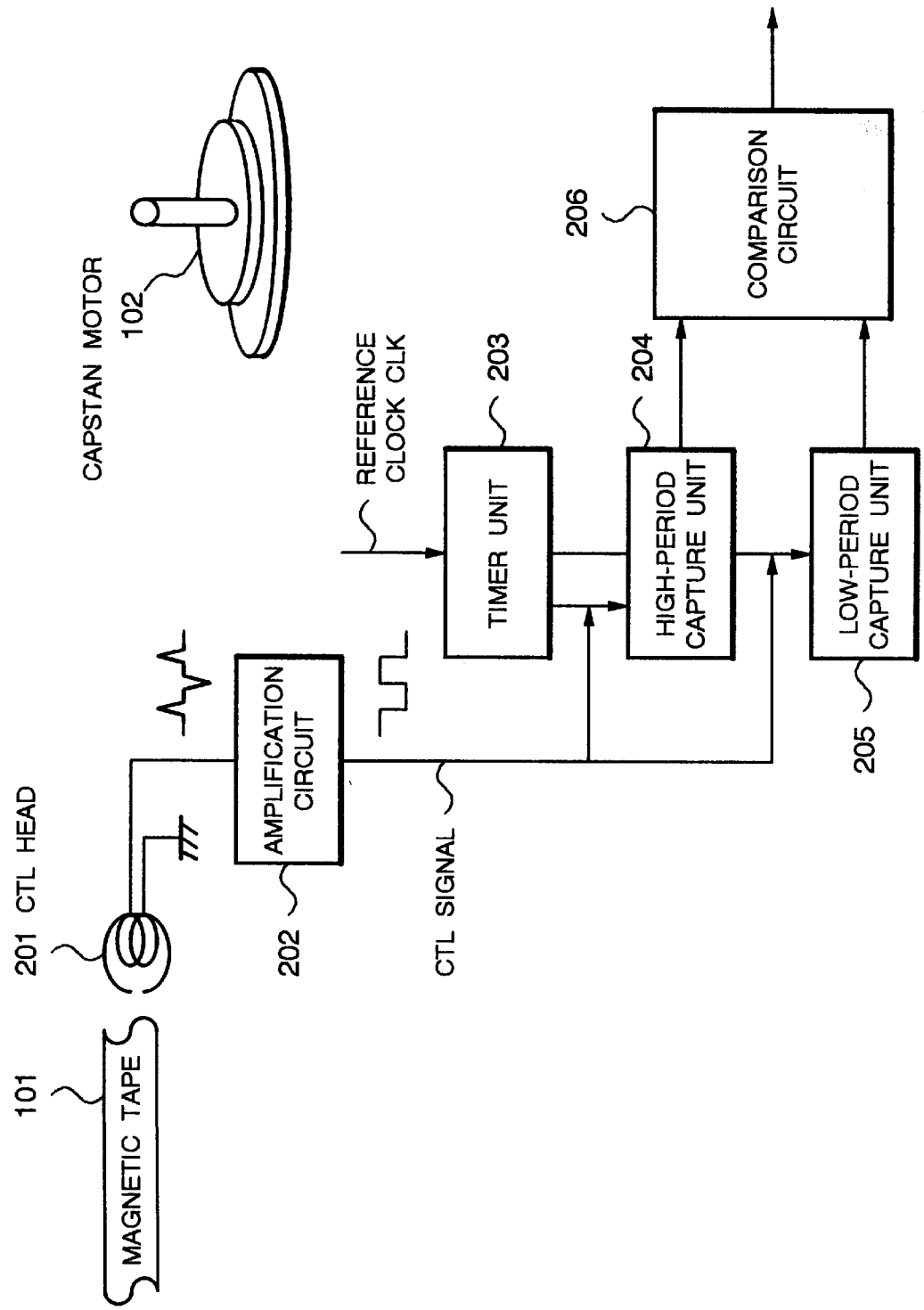
FIG. 9 is a block diagram showing structure of a conventional cue signal detection circuit.

Next, operation of the second embodiment will be detailed with reference to the accompanying drawings. FIG. 7 is a timing chart showing timing of converting a reproduction control signal CTL into an analog voltage according to the present embodiment.

In the present embodiment, the operation of the CTL head 11 to read a reproduction control signal CTL recorded on the magnetic tape 101, of the amplification circuit 12 to amplify and digitize the signal and of the filter unit 13 to convert the digital signal into an analog voltage proportional to a duty ratio is the same as that of the first embodiment described with reference to FIGS. 1 to 3.

The comparator circuit 17 receives input of an analog voltage output from the filter unit 13 and a preset cue signal voltage value of 2.2V and compares the same. Then, only when the analog voltage value applied from the filter unit 13 is lower than the cue signal voltage value of 2.2V, the unit 17 inverts the input voltage and outputs the inverted voltage. More specifically, the unit 17 outputs a low-level signal when a duty ratio is 60% and a high-level signal when the same is 27.5% as shown in FIG. 7.

The frequency-dividing circuit 14, similarly to the above-described first embodiment, frequency-divides a capstan signal CFG to output a timing signal CFT at a fixed rate of timing with respect to a reproduction control signal CTL.

The determination circuit 18 determines whether a reproduction control signal corresponding to a digital signal as an output of the comparator circuit 17 is a cue signal or not in response to the timing of the timing signal CFT received from the frequency-dividing circuit 14. More specifically, the determination circuit 18 determines, when a digital signal of the applied voltage value is at a high level, that the signal has a duty ratio of 60% and when the same is at a low level, determines that the signal has a duty ratio of 27.5%. This makes possible highly precise detection of a cue signal part of a reproduction control signal CTL.

In the present embodiment, a reproduction control signal CTL detected from the magnetic tape 101 is thus converted into 3V+0.3V during the period in which the signal has the duty ratio of 60% and into 1.35V+0.3V during the period in which the signal has the duty ratio of 27.5% by the filtering through the filter unit 13. The obtained analog voltage is compared with a cue signal voltage as a reference voltage to output a high-level signal when the voltage is lower than the cue signal voltage and output a low-level signal when the same is higher than the cue signal voltage. Then, determination of a duty ratio is made based on a level of the digital signal in question. This procedure enables reliable detection of a cue signal in both of the cases where the magnetic tape 101 is running at a low speed and a reproduction control signal CTL has a low frequency of 1 kHz and where the magnetic tape 101 is running at a high speed and a reproduction control signal CTL has a high frequency of 20 kHz.

More specifically, in the present embodiment as well as the first embodiment, assuming for example that with a reproduction control signal CTL having a frequency of 1 kHz to 30 kHz, a sampling clock is 2 MHz, determination can be made whether the reproduction control signal CTL is a cue signal or not within a determination processing time of 4 to 8 $\mu$s. Assuming that a sampling clock is 4 MHz, determination can be made within a determination processing time of 2 to 4 $\mu$s. Also assuming that a sampling clock is 8 MHz, determination can be made within a determination processing time of 1 to 2 $\mu$s. This shows that duty ratio determination processing time is reduced to about one-fourth that of conventional art. As a result, a cue signal determination time is reduced to one-fourth that of conventional art to enable high-speed determination processing.

As described in the foregoing, since in the cue signal detection circuit of a magnetic recording and reproducing device according to the present invention, a voltage of a reproduction control signal CTL is detected at the timing obtained by frequency-dividing a rotation speed signal detected from a capstan motor, detection of a cue signal from among reproduction control signals is possible independently of a frequency of the reproduction control signal even when a magnetic tape runs at a high speed. This enables a traveling speed during the fast-forward (FF mode) and the rewind (REW mode) of the magnetic tape to be enhanced.

In addition, smoothing a digitized reproduction control signal by a filter to detect a cue signal based on an analog voltage value not dependent on a frequency of the reproduction control signal and making determination of a cue signal only by comparison operation allow simple circuit structure to facilitate determination of a cue signal even when a magnetic tape runs at a high speed. This enables reduction in a circuit size of an equipment on which the present invention is mounted such as a microcomputer for VTR to cut down costs.

Furthermore, since frequency-dividing a signal synchronized with a reproduction control signal and having a frequency higher than that of the reproduction control signal and using the obtained frequency-divided signal as the analog voltage taking-in timing enables an analog voltage value of every one cycle to be taken in with ease independently of the frequency of the reproduction control signal, determination results of higher precision can be obtained.

Moreover, since the present invention also allows a cue signal detection circuit to be structured using an analog-to-digital conversion circuit which is used for other purposes in the existing microcomputers, there is no need to add a new circuit. A timer circuit dedicated to the detection of a cue signal is therefore unnecessary which is required in a conventional cue signal detection circuit. As a result, reduction in a circuit size of an equipment on which the present invention is mounted and reduction in costs can be enhanced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cue signal detection circuit mounted on a magnetic recording and reproducing device which reads and writes data from/to a magnetic tape on which data is magnetically recorded for detecting, from among reproduction control signals recorded on said magnetic tape together with said data for use in controlling operation of driving means which runs said magnetic tape, a cue signal recorded with a duty ratio different from that of an ordinary reproduction control signal, comprising:

read means for reading a reproduction control signal recorded on said magnetic tape;

analog-to-digital conversion means for converting a reproduction control signal read by said read means into a digital signal;

filter means for converting a digital signal generated by said analog-to-digital conversion means into an analog voltage corresponding to a duty ratio of the signal;

timing signal generation means for generating a timing signal synchronized with said reproduction control signal in accordance with the operation of said driving means; and cue signal detection means for taking in a voltage value of said reproduction control signal converted into an analog voltage by said filter means at the timing of said timing signal generated by said timing signal generation means to detect said cue signal from among said reproduction control signals based on the taken in voltage value.

2. The cue signal detection circuit as set forth in claim 1, wherein
   said filter means is an integration circuit structured by a combination of a resistor element and a capacitor element.

3. The cue signal detection circuit as set forth in claim 1, wherein
   said driving means is a capstan motor for conducting fast-forward and rewind of said magnetic tape, and
   said timing signal generation means detects a capstan signal based on a rotation speed of said capstan motor and frequency-divides said detected capstan signal to generate said timing signal synchronized with said reproduction control signal.

4. The cue signal detection circuit as set forth in claim 1, wherein
   said cue signal detection means comprising
   second analog-to-digital conversion means for taking in a voltage value of said reproduction control signal converted into an analog voltage by said filter means at the timing of said timing signal generated by said timing signal generation means and converting the same into a digital signal, and
   determination means for comparing a voltage value of a digital signal generated by said second analog-to-digital conversion means and a preset determination reference voltage to determine whether said reproduction control signal is said cue signal or not based on the comparison results.

5. The cue signal detection circuit as set forth in claim 1, wherein
   said filter means is an integration circuit structured by a combination of a resistor element and a capacitor element, and
   said cue signal detection means comprising
   second analog-to-digital conversion means for taking in a voltage value of said reproduction control signal converted into an analog voltage by said filter means at the timing of said timing signal generated by said timing signal generation means and converting the same into a digital signal, and determination means for comparing a voltage value of a digital signal generated by said second analog-to-digital conversion means and a preset determination reference voltage to determine whether said reproduction control signal is said cue signal or not based on the comparison results.

6. The cue signal detection circuit as set forth in claim 1, wherein said driving means is a capstan motor for conducting fast-forward and rewind of said magnetic tape, said timing signal generation means detects a capstan signal based on a rotation speed of said capstan motor and frequency-divides said detected capstan signal to generate said timing signal synchronized with said reproduction control signal, and said cue signal detection means comprising second analog-to-digital conversion means for taking in a voltage value of said reproduction control signal converted into an analog voltage by said filter means at the timing of said timing signal generated by said timing signal generation means and converting the same into a digital signal, and determination means for comparing a voltage value of a digital signal generated by said second analog-to-digital conversion means and a preset determination reference voltage to determine whether said reproduction control signal is said cue signal or not based on the comparison results.

7. The cue signal detection circuit as set forth in claim 1, wherein said filter means is an integration circuit structured by a combination of a resistor element and a capacitor element, said driving means is a capstan motor for conducting fast-forward and rewind of said magnetic tape, said timing signal generation means detects a capstan signal based on a rotation speed of said capstan motor and frequency-divides said detected capstan signal to generate said timing signal synchronized with said reproduction control signal, and said cue signal detection means comprising second analog-to-digital conversion means for taking in a voltage value of said reproduction control signal converted into an analog voltage by said filter means at the timing of said timing signal generated by said timing signal generation means and converting the same into a digital signal, and determination means for comparing a voltage value of a digital signal generated by said second analog-to-digital conversion means and a preset determination reference voltage to determine whether said reproduction control signal is said cue signal or not based on the comparison results.

8. The cue signal detection circuit as set forth in claim 1, wherein said cue signal detection means comprising comparison means for comparing a voltage value of said reproduction control signal converted into an analog voltage by said filter means and a preset determination reference voltage, and determination means for receiving input of comparison results obtained by said comparison means at the timing of said timing signal generated by said timing signal generation means to determine whether said reproduction control signal is said cue signal or not based on the comparison results.

9. The cue signal detection circuit as set forth in claim 1, wherein said filter means is an integration circuit structured by a combination of a resistor element and a capacitor element, and said cue signal detection means comprising comparison means for comparing a voltage value of said reproduction control signal converted into an analog voltage by said filter means and a preset determination reference voltage, and determination means for receiving input of comparison results obtained by said comparison means at the timing of said timing signal generated by said timing signal generation means to determine whether said reproduction control signal is said cue signal or not based on the comparison results.

10. The cue signal detection circuit as set forth in claim 1, wherein said driving means is a capstan motor for conducting fast-forward and rewind of said magnetic tape, said timing signal generation means detects a capstan signal based on a rotation speed of said capstan motor and frequency-divides said detected capstan signal to generate said timing signal synchronized with said reproduction control signal, and said cue signal detection means comprising comparison means for comparing a voltage value of said reproduction control signal converted into an analog voltage by said filter means and a preset determination reference voltage, and determination means for receiving input of comparison results obtained by said comparison means at the timing of said timing signal generated by said timing signal generation means to determine whether said reproduction control signal is said cue signal or not based on the comparison results.

11. The cue signal detection circuit as set forth in claim 1, wherein said filter means is an integration circuit structured by a combination of a resistor element and a capacitor element, said driving means is a capstan motor for conducting fast-forward and rewind of said magnetic tape, said timing signal generation means detects a capstan signal based on a rotation speed of said capstan motor and frequency-divides said detected capstan signal to generate said timing signal synchronized with said reproduction control signal, and said cue signal detection means comprising comparison means for comparing a voltage value of said reproduction control signal converted into an analog voltage by said filter means and a preset determination reference voltage, and determination means for receiving input of comparison results obtained by said comparison means at the timing of said timing signal generated by said timing signal generation means to determine whether said reproduction control signal is said cue signal or not based on the comparison results.

12. The cue signal detection circuit as set forth in claim 1, wherein the reproduction control signal and the cue signal each have a different fixed duty ratio.

13. The cue signal detection circuit as set forth in claim 12, wherein the reproduction control signal has a fixed duty ratio of approximately 60%, and the cue signal has a fixed duty ratio of approximately 27.5%.

* * * * *